United States Patent
Kozyuk et al.

(10) Patent No.: US 9,765,279 B2
(45) Date of Patent: Sep. 19, 2017

(54) METHOD FOR REDUCING NEUTRAL OIL LOSSES DURING NEUTRALIZATION STEP

(71) Applicant: ARISDYNE SYSTEMS, INC., Cleveland, OH (US)

(72) Inventors: Oleg Kozyuk, North Ridgeville, OH (US); Peter Reimers, Shaker Heights, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 0 days.

(21) Appl. No.: 15/283,877

(22) Filed: Oct. 3, 2016

(65) Prior Publication Data

US 2017/0107448 A1 Apr. 20, 2017

Related U.S. Application Data

(60) Provisional application No. 62/241,420, filed on Oct. 14, 2015.

(51) Int. Cl.
*C11B 3/00* (2006.01)

(52) U.S. Cl.
CPC .................................. *C11B 3/001* (2013.01)

(58) Field of Classification Search
None
See application file for complete search history.

(56) References Cited

U.S. PATENT DOCUMENTS

| | | |
|---|---|---|
| 2,125,245 A | 7/1938 | McCray |
| 3,454,608 A * | 7/1969 | Seip ..................... B01D 11/043 210/511 |
| 3,526,391 A | 9/1970 | Church, Jr. |
| 3,545,492 A | 12/1970 | Scheid, Jr. |
| 3,693,457 A | 9/1972 | Pilat |
| 3,856,270 A | 12/1974 | Hemker |
| 4,043,539 A | 8/1977 | Gilmer et al. |
| 4,087,862 A | 5/1978 | Tsien |
| 4,240,972 A | 12/1980 | Mag et al. |
| 4,352,572 A | 10/1982 | Chen et al. |
| 4,418,722 A | 12/1983 | Kendall et al. |
| 4,698,185 A | 10/1987 | Dijkstra et al. |
| 4,869,849 A | 9/1989 | Hirose et al. |
| 4,994,242 A | 2/1991 | Rae et al. |
| 5,547,281 A | 8/1996 | Brooks |
| 5,887,977 A | 3/1999 | Morikawa |
| 6,015,915 A | 1/2000 | Jamil et al. |
| 6,085,644 A | 7/2000 | Klinksiek |
| 6,172,248 B1 | 1/2001 | Copeland et al. |
| 6,844,458 B2 | 1/2005 | Copeland et al. |
| 8,491,856 B2 | 7/2013 | Hassan et al. |
| 8,911,808 B2 * | 12/2014 | Gordon ................. B01F 5/0644 426/238 |
| 2003/0050492 A1 | 3/2003 | Copeland et al. |
| 2009/0306419 A1 | 12/2009 | Myong et al. |

FOREIGN PATENT DOCUMENTS

RU    2008330 C1    2/1994

OTHER PUBLICATIONS

RU 2008330 (C1), Kosachev Vyacheslav S, Process for neutralizing oils and fats, 1994, English translation, 3 pages.*
The International Search Report and Written Opinion issued in corresponding International PCT Application No. PCT/US2016/055169; Mailing Date: Feb. 2, 2017.

* cited by examiner

*Primary Examiner* — Yate K Cutliff
(74) *Attorney, Agent, or Firm* — Pearne & Gordon LLP

(57) ABSTRACT

A method for reducing neutral oil losses during a neutralization step including (1) mixing an acid-treated vegetable oil with a base to neutralize (a) free fatty acid and (b) added acid in the acid-treated vegetable oil to obtain a pretreated mixture; (2) subjecting the pretreated mixture to at least two successive cycles of localized shear effects, each cycle including a step of forcing the pretreated mixture at a pressure through one or more nozzles, each cycle of localized shear effects having a shear duration time of less than $5 \times 10^{-5}$ seconds and a shear rate of at least about 6000 $sec^{-1}$.

14 Claims, No Drawings

METHOD FOR REDUCING NEUTRAL OIL LOSSES DURING NEUTRALIZATION STEP

FIELD OF THE INVENTION

This invention relates to improved methods for refining vegetable oils. More particularly, this invention relates to improved neutralization methods for reducing neutral oil losses during a neutralization step.

BACKGROUND

Vegetable oils are typically oil that is pressed or extracted from vegetable sources. Almost every vegetable oil contains some form of phosphatides (hydratable or non-hydratable), commonly known as gums. Soybean oil contains about 1-3%, corn oil 0.6-0.9%, sunflower oil 0.5-0.9%, and canola oil (crude) 1-3% of phospholipids.

The main components to be removed during vegetable oil refining are the free fatty acids (FFAs) and phospholipids. They are usually removed by applying an acid treatment and caustic soda (alkali) treatment in a neutralization step. The concentration and amount of the alkali to be used will vary with the free fatty acid (FFA) content of the oil.

Neutralization is an important step in the chemical refining of vegetable oils. Alkali neutralization causes a major loss of neutral oil in the chemical refining of edible oils.

Oil loss occurs in two ways; saponification loss and separation loss. Saponification loss is the consequence of alkali being in contact with neutral oil. While alkali is much more reactive with free fatty acid saponification and phosphatide hydration, some reaction occurs with the triglycerides (hydrolysis and subsequent saponification of the free fatty acids). By keeping the alkali strength low, and reducing its contact time and the contact temperature with the oil, saponification of triglycerides can be minimized.

Another occurrence of oil loss can be in the separation of the refined oil (light phase) from the soapstock (heavy phase) produced in alkali refining. Free fatty acids (FFA) are generally removed in neutralization as sodium soaps but neutral oil is also entrapped in the emulsion and removed with the soap during centrifugation. To achieve the lowest separation loss, the process design should provide minimum product stream passing through a centrifuge.

Some improvements have been introduced in oil treatment processes. Improved mixing of chemicals in caustic soda and acid treatment using ultra high shear mixers with regard to finely dispersing the acid/base solution in the oil, and the introduction of enzymes (phospholipases) to specifically attack the gums, have substantially improved the efficiency and oil yields in vegetable oil refining processes.

A method disclosed in U.S. Pat. No. 4,240,972 includes adding an acid to a heated stream of crude vegetable oil and then immediately passing the mixture through a static mixer, mixing for a fraction of a second to produce an acid-in-oil dispersion having acid droplets smaller than 10 microns, and then separating the dispersion into an oil phase and an aqueous phase containing the phosphatides.

U.S. Pat. Nos. 4,698,185 and 6,015,915 describe processes for degumming vegetable oil using high shear Ultra-Turax rotor/stator apparatus.

U.S. Pat. No. 6,172,248 describes improved methods for refining vegetable oils and by-products thereof. In an organic acid refining process, vegetable oil is combined with a dilute aqueous organic acid solution and subjected to high shear to finely disperse the acid solution in the oil. The high shear mixing can include an impeller operating at conditions that produce flow velocities of at least about 45 feet per second. High shear mixing according to the patent generally requires at least one impeller rotating at a speed of from about 900 to about 1500 rpm and having a blade tip speed of from about 4000 to about 9000 ft/min, thereby generating high shear flow velocities of at least about 45 feet per second.

U.S. Pat. No. 6,844,458 describes a process that mixes the acid-oil blend at high shear for a time sufficient to finely disperse the organic acid in the vegetable oil and the high shear mixing occurs for a time of less than about 30 seconds.

U.S. Pat. No. 8,491,856 describes a system for stripping fatty acids from triglycerides with the use of a high shear device with at least one rotor, and wherein the at least one rotor is rotated at a tip speed of at least 22.9 m/s (4,500 ft/min) during formation of the dispersion. The energy expenditure of the high shear device may be greater than 1000 W/m$^3$ during formation of the dispersion. The high shear device includes at least one stator and at least one rotor separated by a clearance.

U.S. Pat. Pub. No. 2009/0306419 describes a method for degumming triglyceride oils by subjecting the feed stream to high shear conditions having a shear rate of at least about 5,000 sec$^{-1}$ and residence times of about 0.05 to 0.5 second.

Allowing the alkali solution and the crude or degummed oil to remain in contact with one another for only short periods of time can minimize saponification losses but it can be insufficient to remove impurities other than fatty acids, especially impurities such as phosphatides and metal compounds.

Accordingly, there is a continuing need for alternative refining methods, which can provide cost-effective removal of phosphorous, with improved oil yield.

SUMMARY OF THE INVENTION

A method for reducing neutral oil losses during a neutralization step comprising the steps of:
(1) mixing an acid-treated vegetable oil with a base to neutralize (a) free fatty acid and (b) added acid in the acid-treated vegetable oil to obtain a pretreated mixture;
(2) subjecting the pretreated mixture to at least two cycles of localized shear effects, the cycles being arranged in succession, each cycle comprising a step of forcing the pretreated mixture at a pressure through one or more nozzles, each cycle of localized shear effects having a shear duration time of less than $5 \times 10^{-5}$ seconds and a shear rate of at least about 6000 sec$^{-1}$.

DETAILED DESCRIPTION OF PREFERRED EMBODIMENTS OF THE INVENTION

As used herein, when a range such as 5 to 25 (or 5-25) is given, this means preferably at least 5, and separately and independently, preferably not more than 25.

The method according to the present disclosure can include the following steps.

In a first step, acid treated vegetable oil is mixed with a base to neutralize the free fatty acids of the oil and the added acid to form a pretreated mixture.

In a second step, the pretreated mixture is subjected to at least two cycles of localized shear effects, the cycles being arranged in succession, each cycle comprises a step of forcing the pretreated mixture at a pressure through one or more nozzles, each cycle of localized shear effects having a shear duration time of less than $5 \times 10^{-5}$ seconds and a shear rate of at least about 6000 sec$^{-1}$. In preferred embodiments of the method the shear rate can be at least 10000, 20000, 30000, 40000, 50000 or 60000, sec$^{-1}$. The shear rate is the fluid velocity at the inside opening of the nozzle divided by the inside opening width/diameter; the nozzle inside opening is equal to the inside diameter if the nozzle opening is circular and is the average width of the opening if the nozzle opening is non-circular; the inside opening of the nozzle is where the opening is narrowest. The shear duration time in the nozzle can be calculated by dividing the internal volume of the nozzle opening by the flowrate through the nozzle opening.

Each of the one or more nozzles of each cycle preferably has an inside opening ranging from about 0.5 mm to about 4 mm, alternatively 0.5-3, 0.5-2, 0.5-1.5, 0.5-1, mm.

The shear cycle repetition period is the residence time period of the pretreated mixture between two successive steps of forcing the pretreated mixture through the one or more nozzles, that is, the residence time between two nozzles arranged in succession. The residence time period can be a shear relief residence time. The residence time period between the successive cycles (between successive nozzles) should exceed 2.0 milliseconds and in preferred embodiments can be in the range of more than 2 and less than 10 or 20 milliseconds. The residence time period can be calculated by dividing the internal volume of processing pipe (section) between two nozzles arranged in succession, by the flowrate through this processing pipe (section).

Each nozzle can have an opening having a circular, non-circular, elliptical, rectangular, annular, polygonal or slit type sectional shape or combination.

The pretreated mixture can be subjected to at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, or more sequential or successive cycles of localized shear effects.

Selecting the proper number of sequential or successive cycles of localized shear effects and the exposure time of the pretreated mixture to the localized shear effects can significantly affect and maximize the yield of refined oil.

A wide variety of devices are suitable to perform the improved neutralization method steps for the process provided herein. For example, devices disclose in U.S. Pat. Nos. 2,125,245; 3,526,391; 3,545,492; 3,693,457; 3,856,270; 4,043,539; 4,087,862; 4,352,572; 4,418,722; 4,869,849; 4,994,242; 5,547,281; 5,887,977 and 6,085,644 can be used for carrying out the disclosed method. For example, U.S. Pat. No. 4,869,849 illustrates a type of device that can be used; a series of plates are provided in a channel, each plate having one or more holes or nozzles. The pretreated mixture is subjected to a cycle of localized shear effects when it is forced through the one or more holes or nozzles of a single plate. The residence time period between two successive cycles is the residence time period between two successive plates. The number of nozzles in each plate or in each cycle of localized shear effects can be at least 1, 2, 3, 4, 5, 6, 7, 8, 9, 10, 11, 12, 13, 14, 15, 16, 17, 18, 19, 20, 25, 30, 35, 40 or more.

The purpose of base neutralization is to remove residual acid, free fatty acids, phosphatides and other materials including protein meal, glycerol, carbohydrates, resins and metals. In addition, some color reduction is achieved. Base in the proper strength and quantity reacts with acid, the free fatty acids and phosphatides to form soapstock and hydratable gums. Having polar and hydrophilic properties, the soapstock produced is effective in removing some of the other impurities from the oil stream. Very intense mixing is needed for complete neutralization reaction because base is not completely selective in reacting with the targets of free fatty acid and phosphatides. Therefore, some triglycerides are also hydrolyzed and saponified (broken down and converted to soap), and considerable amounts of neutral oil are lost.

Saponification loss is the consequence of base being in contact with neutral oil. Allowing the base solution and the crude or degummed oil to remain in contact for only short periods of time can minimize saponification losses but is often insufficient to remove impurities other than fatty acids, especially impurities such as phosphatides and metal compounds. Consequently, short contact times can make it necessary to conduct a second round of refining, which increases the time and costs of oil refining.

Use of too little base, calculated as dry matter, will lead to an incomplete neutralization. On the other hand, an excess of base will lead to saponification of neutral oils.

Without being bound by any particular theory, it is believed that allowing the base solution and the crude or degummed oil to remain in contact for short periods of time (microseconds duration range) under high shear rate with sequential or successive cycles and a shear cycle repetition period or the residence time period between successive cycles in the milliseconds range allows the use of base in stoichiometric or certain minimum excess over stoichiometric amount for neutralization. Under these conditions the saponification of triglycerides can be reduced and the yield of refined oil can be increased.

The method is usually carried out at different temperatures. The method provided herein can be conducted at any temperature deemed suitable by one of skill in the art. In certain embodiments, the temperature during the process can be 20-110 or 30-100 or 50-85 or 60-75° C. In certain embodiments, the temperature during the process is about 20, 30, 40, 50, 60, 70, 80, 90, 100 or 120° C. The vegetable oil in the process is typically maintained at a temperature in the range of about 40° C. to 95° C.

Vegetable oil processed by the disclosed method can be a crude oil or water degummed oil including but not limited to acai oil, almond oil, babassu oil, blackcurrent seed oil, borage seed oil, canola oil, cashew oil, castor oil, coconut oil, coriander oil, corn oil, cottonseed oil, crambe oil, flax seed oil, grape seed oil, hazelnut oil, hempseed oil, jatropha oil, jojoba oil, linseed oil, macadamia nut oil, mango kernel oil, meadowfoam oil, mustard oil, neat's foot oil, olive oil, palm oil, palm kernel oil, palm olein, peanut oil, pecan oil, pine nut oil, pistachio oil, poppy seed oil, rapeseed oil, rice bran oil, safflower oil, sasanqua oil, sesame oil, shea butter, soybean oil, sunflower seed oil, tall oil, tsubaki oil and walnut oil.

The crude oil may have phosphorus content in the range of 200-3000 ppm. Water degummed oil may have phosphorus content in the range of 200-30 ppm.

Acids are used to hydrate non-hydratable phospholipids. The acid in aqueous form may include inorganic or organic acid, including, but are not limited to, phosphoric acid, hydrochloric acid, sulfuric acid, ascorbic acid, acetic acid, citric acid, fumaric acid, maleic acid, tartaric acid, succinic acid, glycolic acid and mixtures or combinations thereof. The base can be selected from the group including, but not limited to, sodium hydroxide, potassium hydroxide, sodium silicate, sodium carbonate, calcium carbonate, and combinations thereof.

After the degumming step, the degummed oil can be separated from the gums, and subjected to further processing steps known in the art including bleaching or deodorizing, as may be necessary or desirable depending on the end use for which the degummed oil product is intended.

The following examples are presented in the Table 1 to illustrate the present disclosure and to assist one of ordinary skill in making and using the same. The examples are not intended in any way to otherwise limit the scope of the invention.

All samples contained 1100 g crude soybean oil with a phosphorus content of 2490 ppm and 0.30% FFA and were heated to a temperature of approximately 70° C. Then 0.012% by weight of concentrated (85 wt %) phosphoric acid was added, followed by 30 minutes mixing with the magnetic stirrer speed of 250 rpm. This acid-treated soybean oil was then placed into a tank connected to a pump. 0.79 wt % of a dilute (8.98 wt %) caustic soda solution was added to the tank and mixed with a 500 rpm speed agitator for 0.5 minute to create a pretreated mixture. The pretreated mixture was transferred from the tank through a processing pipe having the ability for installation of different numbers of successive or sequential nozzles having different opening sizes to the collecting tank. The shear cycle repetition period or the residence time period between successive cycles of localized shear effects or between successive nozzles, also can be changed. The processed material was transferred to centrifuge vials and centrifuged at 900 RCF for 10 minutes. Losses during neutralization were determined by estimating the heavy phase (Vol %) from the centrifugation. Phosphorus and FFA content was determined from analysis of the light phase from centrifugation. The results are shown in Table 1.

TABLE 1

| Test # | Nozzle inside opening (mm) | Nozzle sequential stages | Shear rate in nozzle (1/sec) | Shear duration (sec) | Shear cycle repetition period (sec) | Heavy phase (Vol %) | Phosphorus content (PPM) | FFA % |
|---|---|---|---|---|---|---|---|---|
| 1 | 0.56 | 1 | 66,390 | $32 \times 10^{-6}$ | — | 5.85 | 94.0 | 0.10 |
| 2 | 0.56 | 2 | 66,390 | $32 \times 10^{-6}$ | $0.8 \times 10^{-3}$ | 3.80 | 28.0 | 0.08 |
| 3 | 0.56 | 2 | 66,390 | $32 \times 10^{-6}$ | $2.5 \times 10^{-3}$ | 2.38 | 2.2 | 0.03 |
| 4 | 0.56 | 3 | 66,390 | $32 \times 10^{-6}$ | $4.7 \times 10^{-3}$ | 1.88 | 1.6 | 0.01 |
| 5 | 1.25 | 2 | 50,120 | $16 \times 10^{-6}$ | $2.5 \times 10^{-3}$ | 2.42 | 4.0 | 0.02 |
| 6 | 1.25 | 3 | 50,120 | $16 \times 10^{-6}$ | $2.5 \times 10^{-3}$ | 2.10 | 3.2 | 0.02 |
| 7 | 1.25 | 2 | 50,120 | $16 \times 10^{-6}$ | $4.7 \times 10^{-3}$ | 1.96 | 2.8 | 0.03 |
| 8 | 3.28 | 2 | 6,400 | $48 \times 10^{-6}$ | $9.4 \times 10^{-3}$ | 2.75 | 9.0 | 0.03 |
| 9 | 3.28 | 3 | 6,400 | $48 \times 10^{-6}$ | $9.4 \times 10^{-3}$ | 2.54 | 8.4 | 0.02 |
| 10 | 3.28 | 1 | 6,400 | $48 \times 10^{-6}$ | — | 6.70 | 157 | 0.15 |

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims. It will be apparent to those skilled in the art that many modifications, variations, substitutions, and equivalents for the features described above may be effected without departing from the spirit and scope of the invention as defined in the claims to be embraced thereby. A preferred embodiment has been described, herein. It will be further apparent to those skilled in the art that the above methods may incorporate changes and modifications without departing from the general scope of this invention. It is intended to include all such modifications and alteration in so far as they come within the scope of the appended claims or the equivalents thereof.

What is claimed is:

1. A method for reducing neutral oil losses during a neutralization step comprising the following steps:
    (1) mixing an acid-treated vegetable oil with a base to neutralize (a) free fatty acid and (b) added acid in the acid-treated vegetable oil to obtain a pretreated mixture;
    (2) subjecting the pretreated mixture to at least two cycles of localized shear effects, said cycles being arranged in succession, each cycle comprising a step of forcing the pretreated mixture at a pressure through one or more nozzles, each cycle of localized shear effects having a shear duration time of less than $5 \times 10^{-5}$ seconds and a shear rate of at least 6000 sec$^{-1}$.

2. The method of claim 1, wherein a residence time period between the two successive cycles exceeds 2.0 milliseconds.

3. The method of claim 1, wherein each of the one or more nozzles of each cycle has an inside opening ranging from about 0.5 mm to about 4 mm.

4. The method of claim 1, wherein the acid-treated vegetable oil was treated with an acid selected from the group consisting of phosphoric acid, hydrochloric acid, sulfuric acid, ascorbic acid, acetic acid, citric acid, fumaric acid, maleic acid, tartaric acid, succinic acid, glycolic acid and combinations thereof.

5. The method of claim 1, wherein the base is selected from the group consisting of sodium hydroxide, potassium hydroxide, sodium silicate, sodium carbonate, calcium carbonate, and combinations thereof.

6. The method of claim 1, wherein the acid-treated vegetable oil is an acid-treated crude vegetable oil or an acid-treated water-degummed vegetable oil.

7. The method of claim 2, wherein the residence time period is a shear relief residence time of the pretreated mixture between said steps of forcing the pretreated mixture at a pressure through one or more nozzles.

8. The method of claim 3, wherein each of the one or more nozzles of each cycle has an opening selected from a circular, non-circular, elliptical, rectangular, annular, polygonal or slit type sectional shape.

9. The method of claim 6, wherein the acid-treated vegetable oil is selected from the group consisting of acai oil, almond oil, babassu oil, blackcurrent seed oil, borage seed oil, canola oil, cashew oil, castor oil, coconut oil, coriander oil, corn oil, cottonseed oil, crambe oil, flax seed oil, grape seed oil, hazelnut oil, hempseed oil, jatropha oil, jojoba oil, linseed oil, macadamia nut oil, mango kernel oil, meadowfoam oil, mustard oil, neat's foot oil, olive oil, palm oil, palm kernel oil, palm olein, peanut oil, pecan oil, pine nut oil, pistachio oil, poppy seed oil, rapeseed oil, rice bran oil, safflower oil, sasanqua oil, sesame oil, shea butter, soybean oil, sunflower seed oil, tall oil, tsubaki oil, walnut oil and combinations thereof.

10. The method of claim 1, wherein at least three of the cycles of localized shear effects are arranged in succession.

11. The method of claim 1, wherein at least five of the cycles of localized shear effects are arranged in succession.

12. The method of claim 1, wherein at least ten of the of localized shear effects are arranged in succession.

13. The method of claim 1, wherein at least twenty of the of localized shear effects are arranged in succession.

14. The method of claim 1, wherein said shear rate is at least 20000 sec$^{-1}$.

* * * * *